INVENTOR.
CARL A. DAMM

June 11, 1963  C. A. DAMM  3,093,031
UNIVERSAL STORE SUSPENSION APPARATUS
Filed Dec. 29, 1959   4 Sheets-Sheet 4

INVENTOR.
CARL A. DAMM
BY
AGENT

United States Patent Office 3,093,031
Patented June 11, 1963

3,093,031
UNIVERSAL STORE SUSPENSION APPARATUS
Carl A. Damm, Upper Black Eddy, Pa., assignor to the United States of America as represented by the Secretary of the Navy
Filed Dec. 29, 1959, Ser. No. 862,726
10 Claims. (Cl. 89—1.5)
(Granted under Title 35, U.S. Code (1952), sec. 266)

The invention herein disclosed may be manufactured and used by or for the Government of the United States of America for governmental purposes without the payment of any royalties thereon or therefor.

This invention relates to a universal store suspension apparatus for use in suspending a store and more particularly to a universal store suspension apparatus of singular design adapted for handling different types of stores in various types of aircraft.

The invention is especially suitable for handling a bomb in an aircraft. Due to the large differences in bomb size, shape and structural appendages, and the peculiar requirements of each of numerous aircraft facilities currently available for receiving, carrying, and dispensing bombs, there has developed a need for a similarly large number of variations in suspension apparatus. These variations have been increased even more with the advent of thermonuclear weapons of the type having no bomb lugs by which the bomb can be attached to conventional bomb racks.

The consequences of the condition of accumulative variations in suspension apparatus are obviously disadvantageous from an economic and a military operational standpoint. Additionally, prior art suspension apparatus known in the art possess objectional features unique to themselves. In order to alleviate the many disadvantages and limitations arising out of the design practice heretofore applied, it is essential that the suspension apparatus be of singular construction or configuration capable of universal application for all types of bombs and aircraft facilities for hoisting, carrying, and releasing the bomb.

Other important factors in such a suspension apparatus need to be considered especially on aircraft carriers where armament time must be maintained at a minimum. It has been established that it is preferable that suspension apparatus be installable while the bomb is in storage in the carrier magazine. Weight and size of the apparatus is critical as it will also govern payload size and aircraft range. The apparatus should not free any other hardware upon releasing a bomb so that a hazard is created by hardware falling among a closely-packed formation of aircraft. The apparatus, further, must not introduce heavy impact forces against the aircraft structure during launching of the bomb. Another vital consideration is that the apparatus include reliable means for quickly releasing the bomb at a mandatory point in time.

It is, therefore, an object of the present invention to provide a novel universal store suspension apparatus adapted for hoisting, securing, and releasing different stores including the lugless type in different types of aircraft.

Another object of the invention is the provision of a unique store suspension apparatus which can be easily and quickly installed on a store such as a bomb.

Another object of the invention is directed to providing a novel means for preventing damaging forces to aircraft structure caused by whiplash of the suspension band described herein.

A further object of the invention is to provide an improved suspension apparatus suitable for use in installation on a store in storage and in close proximity of other stores.

A still further object of the invention is the provision of an improved and reliable quick release mechanism for use in a suspension apparatus for releasing and dispensing a store from an aircraft.

Still another object of the invention is directed to providing a novel suspension lug for use in a store suspension apparatus of the type herein described.

Another object of the invention is to provide a novel means for adjusting a store suspension apparatus of the type herein described for various sizes of stores.

A still further object of the invention is the provision of novel means for positively positioning a universal suspension apparatus on a store to compensate for the position of the center of gravity of the store.

These and other objects and many of the attendant advantages of the present invention will be readily appreciated as the same becomes better understood by reference to the following detailed description when considered in connection with the accompanying drawings, wherein:

FIG. 1 diagrammatically illustrates an elevational end view of a bomb secured in an aircraft bomb bay by a universal store suspension apparatus;

Figure 1:
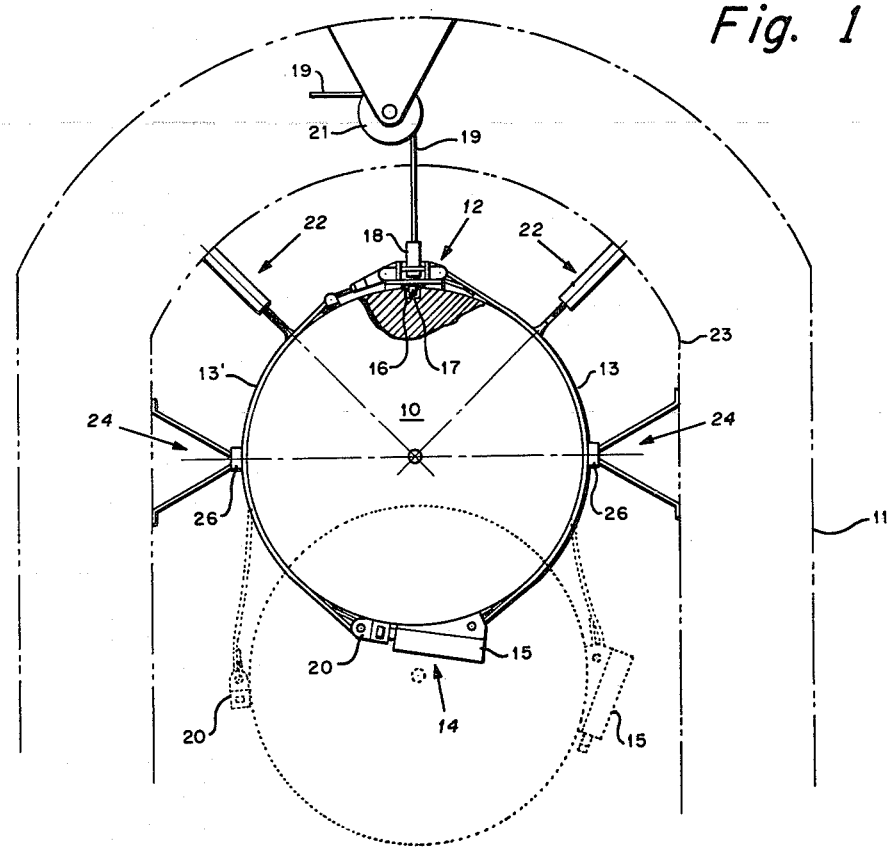

Referring to the drawings, wherein like reference characters designate like or corresponding parts throughout the several views, there is shown in FIG. 1 a front view of a bomb 10 suspended in the bomb bay of an aircraft fuselage 11, shown in hidden outline.

A suspension apparatus comprising a suspension lug 12, suspension bands 13 and 13' and a release mechanism 14 are secured around the circumference of the bomb 10 with the suspension lug 12 positioned on the upper side of the bomb 10 and at a desired point along the longitudinal axis of the bomb 10 with respect to the center of gravity of the bomb. A shear well 16 which is formed on the bomb and receives a shear pin 17 on suspension lug 12 which arrangement determines the approximate location of the suspension apparatus along the longitudinal axis of the bomb 10. The release mechanism 14 comprises connecting members shown by a release shackle 15 and a tunnel lug 20 and will be discussed in more detail with reference to FIGS. 4 to 8. The bomb 10 and apparatus are suspended in the bomb bay by a hoisting shackle 18 and a cable 19 connected to the suspension lug 12 and to a winch or other hoisting means not shown. The illustrated embodiment includes a pulley 21. The bomb 10 is prevented from moving with respect to the aircraft due to roll, yaw and pitch by a plurality of antisway braces 22 fixed to a bomb bay wall 23 and abutting the bomb 10. The braces 22 are adjustable in length and are preferably aligned on a radial line passing through the longitudinal axis of the bomb 10. A preferred arrangement of braces 22 consists of four braces 22: a pair on each side of lug 12 and each pair spaced along the longitudinal axis of the bomb 10 forward and aft of the suspension apparatus. A pair of band restraining braces 24 are secured to the bomb bay wall 23 and engage bands 13 and 13' at or near the horizontal centerline of the bomb 10. The restraining braces 24 include shock pads 26, such as rubber, for the purpose of restraining the bands 13 and absorbing impact after release of the bomb 10.

The suspension bands 13 and 13' constitute one of the distinctive features of the suspension apparatus. Bands 13 and 13' each comprise a pair of parallel strips of metal, as fragmentarily shown in FIG. 2 and are precurved of a thin, high tensile strength, spring steel to form a circumferential envelope for the bomb. The bands 13 and 13' are joined at the bottom of the bomb 10 by release mechanism 14 and at the top by suspension lug 12. The ends of each band 13 and 13' are looped for receiving a pin retained in the release mechanism 14 or suspension lug 12. The loops are formed by folding a straight strip of band material back at each end and welding, bolting or riveting the ends to the central portion of the band which each end faces. In the embodiment shown in FIG. 2, only relatively small portions of bands 13 are folded back. Another preferred embodiment contemplates the folded back portions as being the full length of each band to give added band strength.

The cooperative relationship between the restraining braces 24 and bands 13 and 13' should now be apparent. Upon actuation of the release mechanism 14, the bomb 10 begins to drop, as shown in FIG. 1 by broken lines, forcing the release mechanism 14 to separate. The cantilever spring force of the bands 13 and 13' tend to retain the shackle 15 and tunnel lug 20 against the bomb 10. After the bomb 10 has fallen clear, the bands 13 and 13' curl back and retract the shackle 15 and tunnel lug 20 into the bomb bay of the aircraft. The restraining braces 24 decrease the moment arm of the cantilever portion of the bands 13 and 13', hence increase the retaining force at the shackle 15 and tunnel lug 20. Whiplash of the bands 13 and 13' caused by violent air turbulence in the bomb bay when open are also reduced to insure against damaging impact to sensitive aircraft structure.

Figure 3:
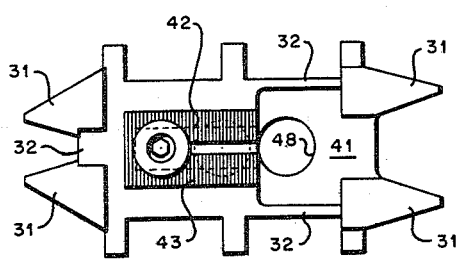
FIG. 3 is a diagrammatic representation of the bottom of the suspension lug shown in FIG. 2 to illustrate the manner in which a shear pin cooperates with the suspension lug and the bomb.
Figure 2:
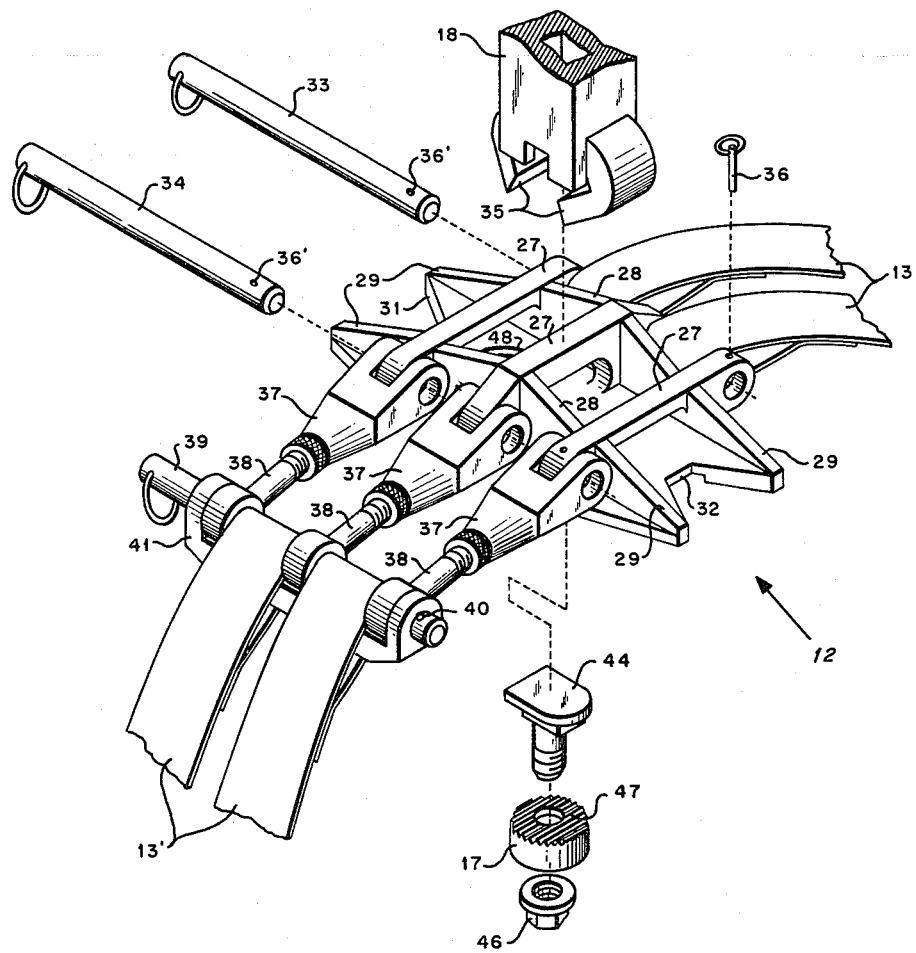
FIG. 2 represents an exploded isometric top view of the suspension lug shown in FIG. 1 and with certain parts removed to illustrate the structural details thereof.

The suspension lug structural details are shown in FIG. 2 augmented by the showing in FIG. 3 of the underside of the suspension lug. The suspension lug 12 is principally characterized by a casting of three load-carrying links 27 separated by truss-type spreaders 28. The ends of spreaders 28 extend outward to form four chocking pads 29 having elongated surfaces 31 bearing against the top of the bomb 10. The surfaces 31 are raised with respect to a base 32 in order that a four-point bearing contact is assured regardless of the bomb diameter. The links 27 necessarily form the heaviest members since they are required to transfer the hoisting load to the bands 13. The ends of each link 27 have holes coaxially bored to take suspension lug pins 33 and 34 each being retained by a cotter pin 36 in a hole 36'. Only one pin 36 is shown. The center link 27 is preferably of heavier construction than the outside links 27 because the center link 27 constitutes the sole connection to hoisting shackle 18 having jaws 35 for tightly closing around the center link 27.

Suspension lug pin 33 directly connects both of bands 13 to one side of the suspension lug 12. Suspension lug pin 34 engages three take-up clevises 37 having eye bolts 38 threadingly engaged therein for adjusting the suspension apparatus for different size bombs. A band pin 39 retained in eye bolts 38 by detent 40 secures one end of each band 13 to the suspension lug 12. Resistance to bending of band pin 39 due to high tensile loads is augmented by pin support 41. The amount of take-up afforded by the clevises 37 and the eye bolts 38 is obviously limited, hence large differences in store sizes may require interchanging the bands 13 and 13' for bands of suitable lengths.

As best seen by FIG. 3, the suspension lug 12 is further defined by a recessed section 41 indented from the bottom surface of the base 32. A portion of the recessed section 41 forms a T slot 42 above a serrated section 43 on the bottom surface of the base plate 32. A T bolt 44 (FIG. 2) is inserted in the slot 42 and, by means of a lock nut 46, a serrated face 47 of shear pin 17 is tightly secured against sliding with respect to the suspension lug 12. The shear pin 17 thus provides two separate functions of preventing movement of the store with respect to the aircraft along the longitudinal axis of the store, and of quickly positioning the suspension lug 12 along the longitudinal axis with respect to the center of gravity of the store. The shear pin adjustment of the present invention assures maximum adjustability of the suspension lug 12 for variations in shear pin well location in a store because the lug can be rotated 180 degrees about the vertical axis thereof, thereby doubling the effective length of the slot 42. An access hole 48 in the base 32 facilitates insertion and removal of T bolt 44 in T slot 42.

Figure 4:
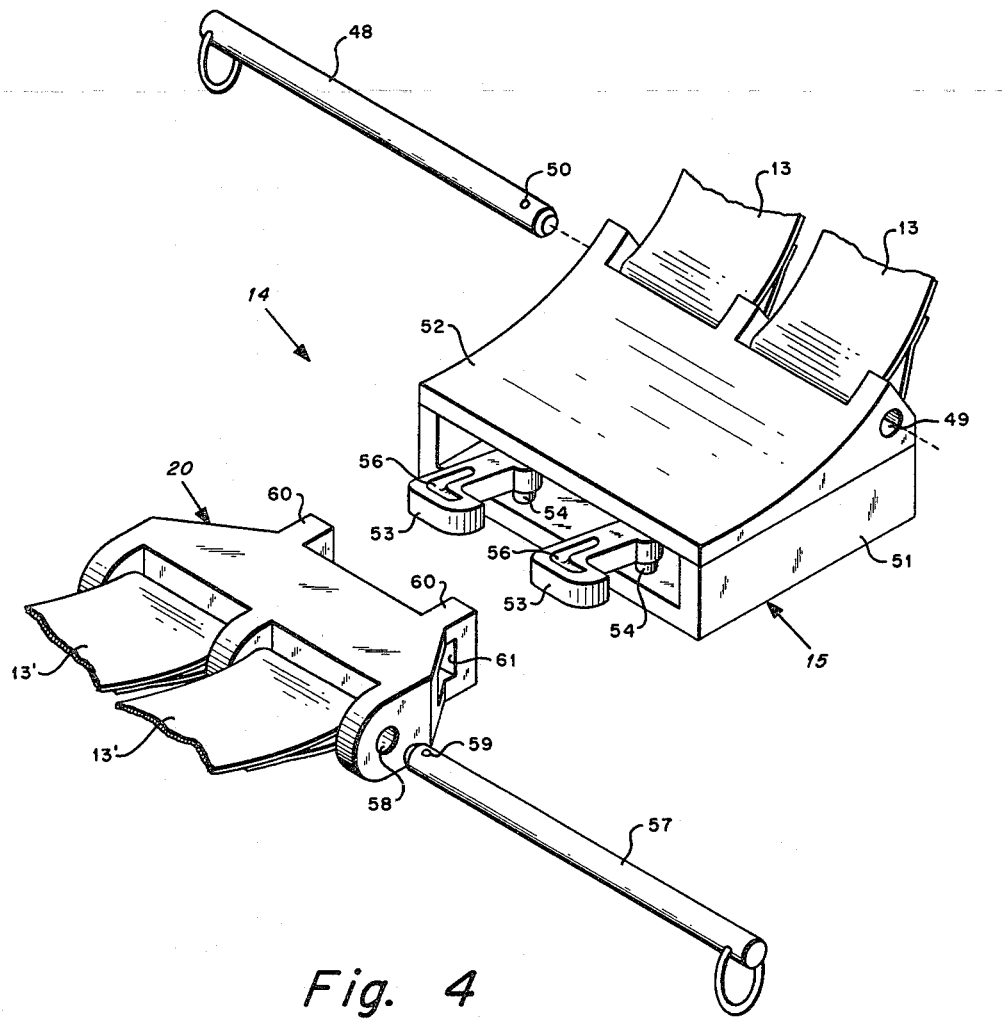
FIG. 4 is a diagrammatic isometric illustration in more detail of a release mechanism shown in FIG. 1, a shackle and a tunnel lug being shown in a release or disconnect position and pins of the release mechanism are shown removed from the shackle and the tunnel lug.

The preferred embodiment of the release mechanism 14 of FIG. 1 is illustrated in an enlarged view in FIG. 4. The shackle 15 comprises a housing having a chassis 51 and cover 52 to which the bands 13 are connected by a shackle pin 48 inserted through three coaxially aligned shackle pin holes 49 in the cover 52. The pin is retained by a cotter pin (not shown) in a drilled hole 50. Tandem-arranged hooks 53 rotate about pivots 54 and protrude from the shackle housing. The pivots 53 are fixed to the chassis 51 and are further retained by the cover 52. The hooks 53 define a modified H-beam section at the throat cross-section 56 rather than a solid section, in order to move the centroidal axis of the section through the throat toward the pivot. The moment arm is thus reduced and lighter but stronger hooks result therefrom.

The tunnel lug 20 comprises a single casting for receiving the hooks 53. The lug 20 is connected to the bands 13' by a tunnel lug pin 57 retained in coaxially aligned tunnel lug holes 58 by a cotter pin (not shown) in drilled hole 59. Lug elements 61 each has a hole 62 therein for engaging hooks 53 of the shackle 15.

Figure 5:
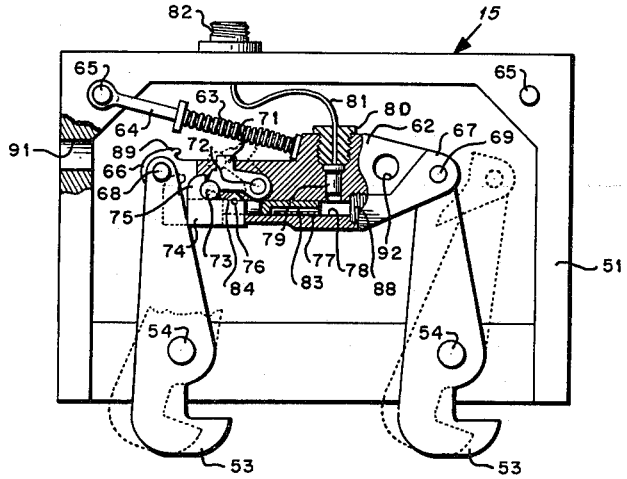
FIG. 5 is a detailed representation of the shackle of FIG. 4 showing the manner of cartridge-actuating the shackle.

FIG. 5 illustrates the shackle 15 of FIG. 4 with the cover 52 removed. For the purpose of disclosing the manner in which the shackle 15 is cartridge actuated, elements which function solely for manual and electrical actuation are omitted. The shackle elements are illustrated in the latched position by solid lines and certain elements are also partially shown in the latch-released position by broken lines. The tandem-arranged hooks 53 are simultaneously rotatable about pivots 54 by a hook linkage bar 62 having bifurcated ends 66 and 67 articulated at connecting pins 68 and 69, respectively. An accelerator spring 63 on spring guide 64, and pivoted on chassis 51 by anchor pin 65, biases the bar 62 and the hooks 53 toward the unlatched position. A bifurcated pawl 71 straddles bar 62 by means of a cross-member 70. The pawl 71 is pivotally connected at one end to the bar 62 by pawl pin 72. The other end of the pawl 71 forms riders or pawl bosses 73 extending outwardly from the sides of pawl 71. As illustrated, only one boss 73 is shown, the other being in a plane behind the drawing and coinciding with the boss shown. The pawl 71 is retained in the latched position by a bifurcated pawl retainer 74 having fingers 75 for engaging the bosses 73 of pawl 71. The retainer 74 is positioned and secured to the bar 62 by a retainer shear pin 76. The retainer 74 also includes a piston 77 in a cylinder 78. The cylinder 78 receives hot gases from an explosive charge or primer 79, retained in place by a cap 80, and electrically ignited by an ignition wire 81 having an external disconnect 82 connected to an electrical source, not shown. A dump vent 83 provides communication between the cylinder 78 and the interior of the shackle housing when the piston 77 has moved in the cylinder an amount sufficient to expose the vent 83. A cam rise 84 on retainer 74 causes the boss 73 to rotate clockwise (as shown) about pin 72 when the retainer 74 is actuated by the primer 79.

Figure 6:
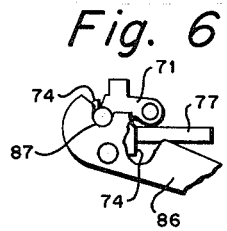
FIG. 6 is a fragmentary view of the shackle of FIG. 5 illustrating the manner of combining the cartridge-actuation and an electrical and manual actuation in the shackle.

Operation is such that when the primer 79 is fired, the hot gases exert a large initial force on piston 77 which is expended in shearing the pin 76. Thereafter, the piston moves retainer 74 out of engagement with pawl 71. The retainer 74 loses force when the vent 83 is exposed, but sufficient force remains to rotate pawl 71 upon contact with cam rise 84. Referring also to FIG. 6, it will be seen that the boss 73 when in the latched position also engages a sear 86 in a notch 87 for preventing the bar 62 from moving to an unlatched position. The sear 86 does not move when the primer 79 is fired, hence, the boss 73 will be cammed out of the notch 87 by the cam rise 84 on the retainer 74 when the retainer is moved toward the left, as shown. Hence, the bar 62 and the hooks 53 are biased to the releasing position shown by the broken lines.

A clean-out plug 88 provides access for cleaning the cylinder 78. Prongs 89 on each member of the bifurcated end 66 are adapted to receive a latching tool through an access hole 91. A safetying hole 92 aligns with another hole (not shown) in the shackle housing for inserting a safetying pin (not shown). The safetying pin is removed before the release mechanism 14 is to be actuated.

Figure 7:
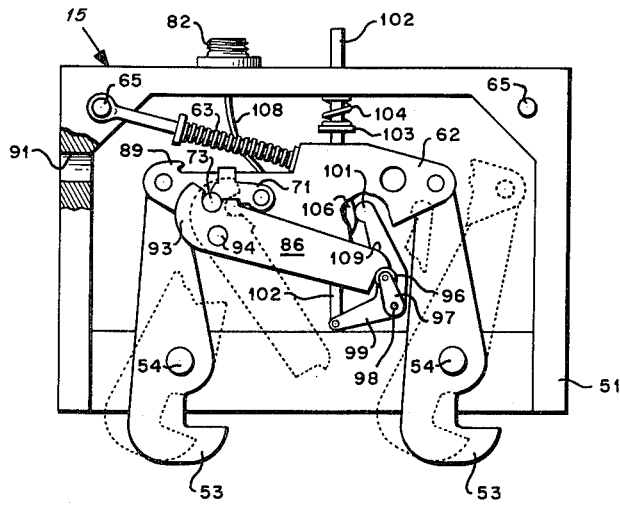
FIG. 7 is another detailed representation of the shackle of FIG. 4 showing elements for electrically and manually actuating the shackle.

FIG. 7 further illustrates the shackle 15 of FIG. 4 with the cover 52 removed. For the purpose of disclosing the manner in which the shackle 15 is manually or electrically actuated, elements which function solely for cartridge actuation are omitted. The shackle elements are illustrated in the latched position by solid lines and certain elements are also partially shown in the latch-released position by broken lines. As stated above, with reference to FIGS. 5 and 6, the bar 62 and the hooks 53 are held in the latched position by the boss 73 of pawl 71 being seated in the notch 87 of the sear 86. By the cartridge actuation shown in FIGS. 5 and 6, the bar 62 is released by rotating the pawl 71 away from the sear 86, thus clearing the boss 73 of the notches 87. In FIG. 7, however, it will be seen that the sear 86 is electrically or manually rotatable away from the pawl 71 thus clearing the notch 87 of the boss 73 to accomplish the same result; namely, of releasing the bar 62. The sear 86 is bifurcated at one end 93 in order to straddle the retainer 74 and engage the boss 73. The sear 86 is further articulated about a sear pivot 94 fixed to the chassis 51 of shackle 15 and is urged against a release roller 96 by the bias of the spring 63 transmitted to the right side of the notch 87 (as illustrated in FIG. 7). The roller 96 is rotatable at the end of a release lever 97 which in turn is articulated about a lever pivot 98 fixed to the chassis 51 of shackle 15. It is contemplated that a plurality of rollers 96 be employed for increasing the bearing surface and for reducing rolling friction. Release lever 97 is further defined by a manually actuated arm 99 and solenoid actuated arm 101 each fixed at the pivot end of the lever 97. The outer end of arm 99 is pin-connected to a manual release plunger 102 including a shoulder 103. Through plunger 102 and arm 99, a plunger spring 104 urges the release lever 97 against the sear 86. A cable, not shown, is connected to plunger 102 for manually unlatching the hooks 53.

For manual release, the plunger 102 is raised against the bias of spring 104, rotating arm 99 and lever 97 clockwise about pivot 98 thereby clearing roller 96 of the end of the sear 86. The bias of the accelerator spring 63 causes the sear 86 to free the boss 73 and permit bar 62 and hooks 53 to move to the position shown by broken lines to unlatch the tunnel lug 20 and release the bomb 10 of FIG. 1.

Figure 8:
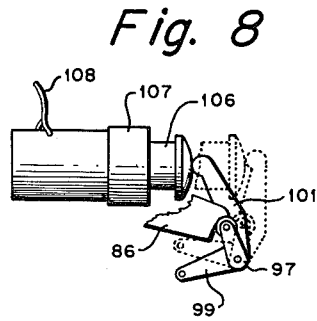
FIG. 8 is a still more detailed illustration of an electrical solenoid partially shown in FIG. 7.

The bar 62 is illustrated as broken away to show the solenoid actuated arm 101 abutting a solenoid plunger 106. FIG. 8 shows the plunger 106 actuated by an electric solenoid 107 connected by a lead wire 108 to the external disconnect 82. Energization of the solenoid 107 moves plunger 106 so that arm 101 and lever 97 rotate clockwise about pivot 98 thereby clearing the roller 96 of the sear 86 and unlatching the tunnel lug 20 in the manner as described above for the manual operation.

The shackle 15 release elements are also adapted for easy latching and cocking of the hooks 53. Referring again to FIG. 5, pawl 71 and retainer 74 are manually positioned together as shown and a retainer shear pin 76 is inserted to maintain the position. The primer 79 is inserted under the cap 80. The above steps are preferably performed before installing the suspension apparatus on a store. When the shackle 15 is to be finally connected on a store, the shackle 15 and the tunnel lug 20 are joined. The hooks 53 are brought into lug element holes 61 by a latching tool which extends through the access hole 91, hooks on prongs 89 for manually pulling the bar 62 to the left. As bar 62 is pulled to the left, the boss 73 abuts the notch 87 rotating sear 86 counterclockwise about sear pivot 94. An upper surface 109 of the sear 86 contacts roller 96. Continued counterclockwise rotation of the sear 86 also dictates clockwise rotation of lever 97 to the latched position wherein the roller 96 is seated at the end of the sear 86 in the manner illustrated in FIG. 7. The latching tool can be removed from the prongs 89 permitting the spring 63 to urge the bar 62 to the right. However, movement to the right of the bar 62 is resisted by bosses 73 bearing against the right side of the notch 87 on the sear 86. Sear 86 is thus restrained from clockwise movement by the latched position of lever 97.

Alternative means for actuating the piston 77 or lever 97 are by hydraulic and pneumatic systems.

It should now be apparent that the shackle 15 incorporates two basically independent release actuations: lever and cartridge. The lever actuation is further comprised of two independent actuators: manual and electrical. The operation of each actuation, in large measure, does not depend upon the functions of the others. It should also be noted that the elements appear in duplicate to assure positive securement of a store in a suspension apparatus even though one or several of the elements should fail under heavy loads. Such a feature is vital where the store is a nuclear bomb. Notwithstanding this duality of elements, simplicity of construction is afforded.

It should be understood that the foregoing disclosure relates only to preferred embodiments of the invention and that numerous modifications and variations may be made therein without departing from the spirit and scope of the invention as set forth in the appended claims.

What is claimed is:

1. A universal suspension apparatus for hoisting, securing and releasing a horizontally disposed bomb of any size from any one of several types of aircraft having a bomb bay and a hoisting shackle for the bomb, comprising, in combination: a suspension lug having three load-carrying links for being mounted on the top of the bomb, two parallel truss-type spreaders connected to said links for maintaining said links parallel in one plane and in spaced relationship, adjacent ends of said spreaders extending beyond said links and being tapered for resiliently bearing against the surface of the bomb, one of said three load-carrying links being a center link adapted to be secured by the hoisting shackle of the aircraft, adjacent ends of said links extending beyond said spreaders and forming two parallel rows of three aligned holes, a suspension lug pin removably inserted through each row of said aligned holes in the ends of each of said links, adjusting means including a band pin secured to one of the suspension lug pins for compensating for various bomb sizes, four suspension bands having their ends turned back to form loops and arranged in two pairs for being circumferentially mounted around the periphery of the bomb, said loops at one end of one of said pairs of said four suspension bands disposed about said band pin and said loops at one end of the other of said pairs of said four suspension bands disposed about the other of said suspension lug pins, a release mechanism for being mounted at the bottom of the bomb, said release mechanism having a release shackle having a plurality of coaxial holes formed therein and a tunnel lug, said release shackle having a shackle pin inserted through said plurality of coaxial holes in said release shackle, said loops at the other end of said one of said pairs of said four suspension bands disposed about said shackle pin, said tunnel lug having a tunnel lug pin and a plurality of coaxial holes formed therein, said tunnel lug pin being inserted through said coaxial holes formed in said tunnel lug, said loops at the other end of said other of said pairs of said four suspension bands disposed about said tunnel lug pin, said release shackle and tunnel lug accordingly being connected to form substantially continuous bands around the bomb, said release shackle including means for quickly disconnecting and causing the separation of said release shackle and said tunnel lug for releasing the bomb, and said bands being pre-curved so that the ends thereof are resiliently biased inwardly toward the center of the bomb in such a manner that said release shackle and said tunnel lug tend to be retracted upwardly toward said suspension lug when the bomb is released from the aircraft.

2. A universal suspension apparatus for hoisting, securing and releasing a store of any size in any one of a number of different aircraft having a bomb bay and a store hoisting shackle, the store having an axially elongated shear well comprising, in combination: a suspension lug having at least three load-carrying links arranged in parallel for being mounted on the top of the store, truss-type spreaders separating said links, adjacent ends of said spreaders extending beyond said links and being tapered for resiliently bearing against the surface of the store, one of said links being a center link adapted to be secured by the aircraft hoisting shackle, each end of the links having connecting means thereon for attaching a plurality of suspension bands, a first group of suspension bands each looped at one end thereof and attached to the connecting means at one end of the links, a second group of suspension bands each looped at one end thereof and attached to the connecting means at the other end of the links, a release mechanism for being positioned at the bottom of said store having a release shackle and a tunnel lug, said first group of bands looped at the other end thereof and connected to said release shackle, said second group of bands looped at the other end thereof and connected to said tunnel lug, said release shackle including means for quickly separating said release shackle and tunnel lug for releasing the store, and said bands being precurved so as to be biased inwardly toward the center of the store and thereby causing the retraction of said bands when the store is released from the aircraft.

3. Apparatus as claimed in claim 2 and further comprising shear pin means disposed in said suspension lug and having one end cooperatively disposed in the shear well in the store, and serrated support means for adjusting said lug in either direction along the longitudinal axis of the store thereby compensating for any variations in the position of the center of gravity of the store with respect to the shear well.

4. Apparatus as claimed in claim 2 wherein one of the connecting means includes a variable length clevis pivotally connected to its associated end of each of said links, the other end of said clevis being pivotally connected to its associated looped suspension bands, whereby the internal circumference of said continuous band can be varied.

5. Apparatus as claimed in claim 2 and including a plurality of band restraint braces disposed at the sides of the store, means for securing one end of each of said braces to a structural member of the aircraft, and means for securing the other end of each of said braces to said suspension bands, whereby the bands are substantially restrained from outward movement as the store is released from the aircraft.

6. Apparatus as claimed in claim 2 and including means for restraining the outward movement of said band means as the store is released from the aircraft.

7. A suspension lug for use with a store suspension band and a store having a well, comprising: three parallel load carrying links, two spaced truss-type spreaders fixed to said links, one of said links being centrally located and adapted to be secured to a hoisting shackle, two suspension lug pins, the ends of said links having aligned holes formed therein, one of said suspension lug pins being disposed in each of said link holes, a base interconnecting said links, and four chocks integrally connected to the corners of said base and having raised bearing surfaces formed thereon, said bearing surfaces providing a four-point contact of said lug with the surface of the store.

8. A suspension lug as claimed in claim 7, further comprising, shear pin means cooperatively disposed in the well in the store, and serrated support means for adjusting said load carrying links in either direction along the longitudinal axis of the store, thereby compensating for any variations in the position of the center of gravity of the store with respect to the well.

9. A suspension lug as claimed in claim 7, further comprising, band adjusting means, said band adjusting means including a variable length clevis pivotally connected to one end of each of said links, the other end of said clevis being adapted to be pivotally connected to the store suspension band, whereby the internal circumference of the store suspension band can be varied.

10. A suspension lug for use with a store suspension band, a hoisting shackle, and a store having a shear pin well formed therein comprising: a plurality of load-carrying parallel links, a plurality of truss-type spreaders separating said links and extending beyond the outermost of said links, one of said links being a center link adapted to be secured by the hoisting shackle, each of said links being formed to connect to the suspension band, the underside of said spreaders forming a plurality of resilient bearing surfaces to provide multi-point contact with the surface of the store, a base adjacent to the underside of said spreaders having an elongated T slot formed therein extending in a direction parallel to said spreaders, the underside of said base further including serrations along the length of said T slot, a T bolt inserted in the slot and slidable along the length thereof and having the shank portion projecting transversely beyond the underside of said base, a shear pin including serrations for matingly engaging the serrations on said base and encircling said shank portion, and a lock nut threadingly engaged to the shank portion for urging said shear pin into positive engagement with said base; whereby the position of said suspension lug along the longitudinal axis of the store with respect to the center of gravity of the store is adjustable.

References Cited in the file of this patent

UNITED STATES PATENTS

| | | |
|---|---|---|
| 642,466 | Law | Jan. 30, 1900 |
| 842,482 | Matson | Jan. 29, 1907 |
| 2,206,777 | Kee | July 2, 1940 |
| 2,393,105 | Hasselhorn | Jan. 15, 1946 |
| 2,462,744 | Hasselhorn | Feb. 22, 1949 |
| 2,552,578 | O'Mara et al. | May 15, 1951 |
| 2,555,635 | Dickerman | June 5, 1951 |
| 2,756,091 | Komerska | July 24, 1956 |
| 2,826,119 | Barrowman | Mar. 11, 1958 |
| 2,896,288 | Davis | July 28, 1959 |